Oct. 18, 1966   F. S. SCHILER   3,279,076
APPARATUS FOR DEFORMING PLANAR MEASURING SURFACES
Filed June 17, 1964

INVENTOR.
FREDERICK S. SCHILER
BY
ATTORNEY

United States Patent Office 3,279,076
Patented Oct. 18, 1966

3,279,076
APPARATUS FOR DEFORMING PLANAR
MEASURING SURFACES
Frederick S. Schiler, Stow, Ohio, assignor to Portage
Machine Company, Akron, Ohio, a corporation of
Ohio
Filed June 17, 1964, Ser. No. 375,711
1 Claim. (Cl. 33—112)

This invention relates to the art of machine tools and in particular has reference to a method of adjusting the planar contour of precision machined surfaces such as the edge of try-squares for example.

In the art of precision tool manufacturing, it has long been known that certain inaccuracies inherently exist with respect to such tools and with the increasing demands for closer and closer tolerances, the disadvantages of such inaccuracies become more and more important to the machine tool manufacturer.

As a representative example of precision tools employed in the machine tool industry for the purpose of building extremely accurate precision tools, reference is made to the conventional squaring fixture which includes a base that is normally designed to slide across the surface table and further includes an upright right angle blade portion, with the normal arrangement being that the work engaging surfaces of the blade and base are machined to the highest degree possible to insure that the same are exactly at right angles to each other.

It has been indicated above that obtainment of this desired objective is not always possible at the present time in all instances due to the inability of the machine tools to obtain the exact degree of accuracy required by present day standards.

Accordingly, it is apparent that if the blade surface, for example, is out of true perpendicular relationship with the appropriate surface of the base, this inaccuracy will be transmitted to all subsequent parts that are gauged and/or measured by this tool, with the result that the inaccuracies in the basic squaring fixture will result in inaccuracies in the subsequent parts whose dimensions are calibrated from this tool.

The inaccuracies above referred to either occur during original manufacture or are caused by conditions appearing during use, such as careless handling, temperature changes, and the like, with the changes in weather affecting an appropriate change in the precision tool involved so as to cause the same to be inaccurate.

Because the inaccuracies involved are in the most insances of infinitesimal, but nonetheless of damaging amount, it has been discovered that the same can be compensated for by providing adjustment means that effectuate deformation of the material to permit overcoming of the aforementioned inaccuracies.

More specifically, it has been found if a tapered bore is provided in relatively close adjacency with the surface to be leveled, for example, that the use of an appropriate contoured tapered plug within this just described bore will effectuate a deforming action on the metal surrounding the bore during the time that the plug is being progressively inserted within the bore. In the preferred instance, a complemental threaded arrangement will be used by the bore and plug so as to achieve a maximum pressure of radial expansion on the walls of the bore, while yet retaining adjustment characteristics by virtue of the use of the threaded connection of the bore and plug.

While the pressure of radial expansion will be equal on the walls of the bore, it nonetheless follows that the deforming effect will occur in the region where the least metal can resist this just described force of deformation that is created by the radially directed expanding pressures being applied to the bore.

Hence, and by placing only a thin web of metal between the bore and the surface to be adjusted, or in the alternative by threading the bore through the surface, it is apparent that minimal resistance to deformation will be provided in the area to be adjusted, with the result that the precise locating of the bore in the fashion just described will serve to effectuate deflection at the critical point to thus effectuate adjustment of the entire planar surface with respect to the bore.

Application of this inventive concept to commercial utilization accordingly becomes the principal object of this invention with other objects of the invention becoming more apparent upon a reading of the following brief specification, considered and interpreted in the light of the accompanying drawings.

Before proceeding further with the description of the detailed forms of the invention above indicated, it is thought appropriate to again reiterate the fact that the adjustments being effectuated are very small in point of measurement and accordingly it is to be understood that the drawings are enlarged for the purpose of expanding the concepts of the invention so as to be sufficiently clear, with it being understood that the deflections achieved would be in the nature of deflections of one ten-thousandth of an inch in normal practice, and with such deflections and final adjustment being effectuated only after all normal precision machining operations have been performed.

Figure 1:
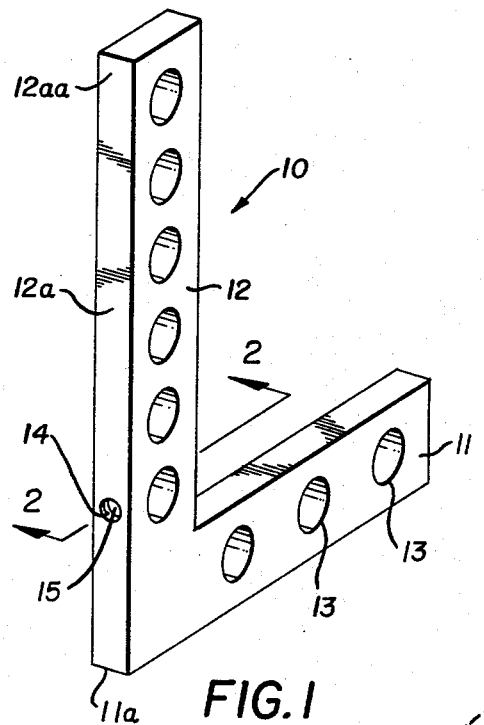
FIGURE 1 is a perspective view of the invention illustrated in connection with a standard try-square.

Referring now to the drawings and in particular to FIGURE 1, the improved try-square, generally designated by the numeral 10, is of unitary construction so as to include a base 11 and an upright leg portion 12, with the base 11 having a surface 11a that is designed to move across the usual surface table and with the upright leg portion 12 having a planar surface 12a that is disposed, within the tolerance limits of precision machinery, at exactly right angles to the surface 11a.

As indicated above, the try-square 10 is of unitary construction, and to this end, the same further includes lightening holes 13, 13 that are provided in known fashion for the purpose of making the tool more readily usable by the operator.

For the purpose of effecting deflection of the planar surface 12a and particularly of the upper extremity 12aa thereof, the surface 12a is shown provided with a tapering bore 14 that is threaded at 14a for complemental engagement with the threads 15a of a complementally contoured tapered plug 15, with the plug 15 having a longitudinal dimension along its axis that is somewhat shorter than the depth of the bore 14 so as to permit the same to be countersunk for the purpose of avoiding interference during use of the try-square 10, and with the plug 15 having normal turning slots within which a screw driver or other turning tool can be inserted to effectuate rotation of the plug 15 within the bore 14.

Figure 2:
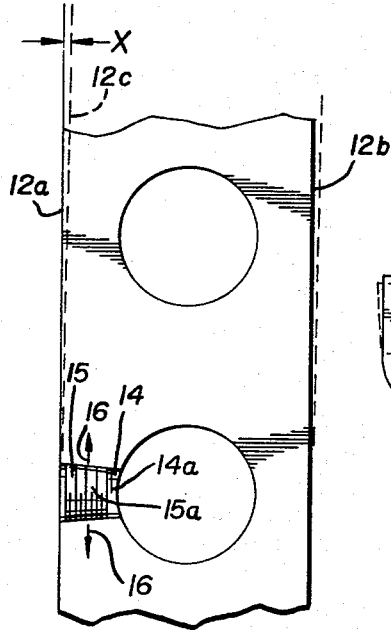
FIGURE 2 is a vertical section taken on the lines 2—2 of FIGURE 1.

Turning now to FIGURE 2, it will be seen that the operation of the device of FIGURES 1 and 2 merely requires that the plug 15 be rotated clockwise, for example, within the bore 14 with this rotational movement serving to wedge the plug 15 deeper within the confines of the bore 14, so as to create a series of radial expanding pressure points, the typical ones of which are indicated by the arrows 16—16 that appear in FIGURE 2 of the drawings.

While the pressure applied in the direction of arrows 16—16 will be equal, it will be noted that deformation will occur more readily in the area where the bore 15 opens into the surface 12a and accordingly, the surface 12a will be progressively deformed along its upward extent to the position indicated by the dotted lines in FIGURE 2, with the deflection X occurring as indicated in FIGURE 2.

It will be noted in this regard that the deflection X will occur in the location just described because of the fact that while the pressures occuring during deflection are equally applied to the walls of the bore, there is a lesser area of metal resisting deflection in the direction just described with the result that the deflecting forces overcome the least force resisting the same to create a deflection as just described.

In view of the fact that the metal involved herein has inherent recovery properties, it is of course apparent that the reverse of the situation just described is true, with the result that deflection can occur in the reverse fashion by backing off the plug 15 within the bore 14.

In this fashion, precise adjustment can be obtained so as to insure that the entire planar surface 12a is absolutely perpendicular with the surface 11a, with it being apparent that if more deflection is required, additional apertures and plug arrangements of the type just described can be employed to achieve such purpose. Conversely, deflection to the left of FIGURE 2 could be obtained by locating the bore 14 in surface 12b.

Figure 3:
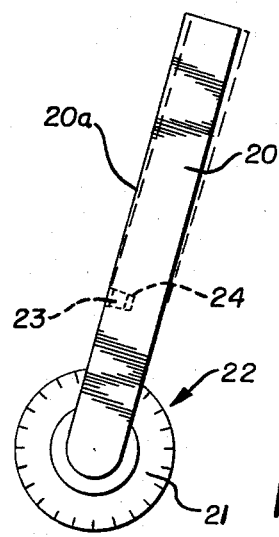
FIGURE 3 is a plan view of a protractor showing utilization of the deforming means.

Referring next to FIGURE 3, there is shown a straight edge member 20 having one end thereof pivotally mounted with respect to a base member 21, with the entire unit just described coacting together to form a protractor 22 of known type.

In the instance where the measuring edge 20a of the arm 20 is not perfectly level, it is again apparent that the concept just described can be employed by providing a threaded plug 23 that is received within a threaded tapering bore 24 with deflection to the chain dotted line position of FIGURE 3 again occurring as just indicated following further insertion of plug 23 within bore 24.

In the two forms of the invention just described, deflection has been achieved by tapping the bore at right angles to the plane of the planar surface that is to be deflected.

Figure 4:
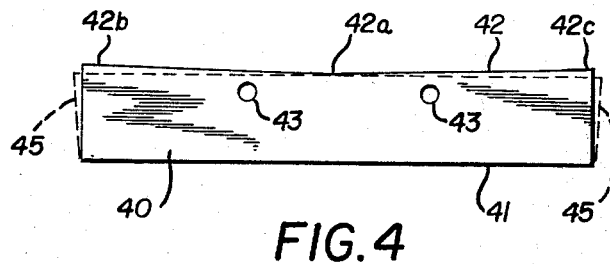
FIGURE 4 is a side elevational view of the gauge block employing the novel inventive concepts of this invention.
Figure 5:
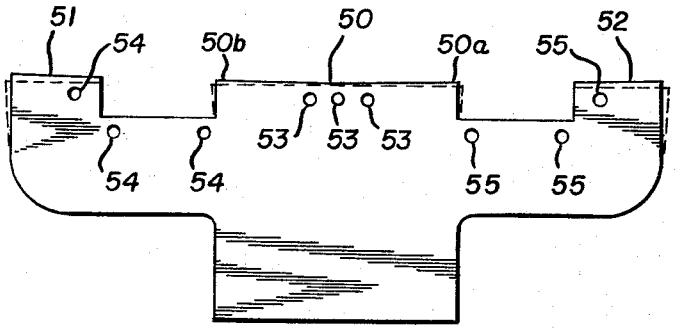
FIGURE 5 is an end elevation showing the utilization of the concept for the purpose of effectuating leveling with respect to the spaced surfaces which must be aligned in co-planar relationship in a lathe bed for example.

By way of contrast, in FIGURES 4 and 5 about to be discussed, deflection is shown achieved by the use of tapered bores that do not open into the planar surface that is to be leveled, with it being noted, however, that the axes of the bores in FIGURES 4 and 5 are parallel with the surface to be adjusted and are further disposed in close proximity therewith so as to provide minimal metal surface area that can resist the deformation force created when the plug radially expands the walls of the tapered bores employed.

Thus in FIGURE 4, a gauge block 40 is shown having the lower surface 41 and an upper surface 42 that is indicated, in exaggerated fashion, as tapering from a low point 42a to high end points 42b and 42c.

To effectuate leveling of the surface 42 so as to bring the surfaces 42a, 42b and 42c in co-planar alignment, one or both of the opposed side walls of the gauge block 40 are provided with tapered bores 43, 43 within which complementally tapered and threaded plugs (not shown) may be inserted in accordance with the teachings above discussed in FIGURES 1 through 3 inclusive.

In this regard, it will be noted that when the plugs are driven inwardly of the bores 43, 43, the radial expansion force created thereby will have the greatest deforming effect on the minimal metal volume provided between the walls of the bore 43 and the surface 42, with the result that the entire metal surface will be deformed to the chain-dotted line position of FIGURE 4 by the appropriate amount of insertion of tapering plugs within the bores 43, 43, with it being noted that the longitudinal length of the surface 42 in effect "grows" so as to provide tapered end walls 45, 45 as indicated by dotted lines in FIGURE 4. In the normal instance, the planar configuration of the bottom surface 41 will be unaltered by the just described deformation, due to the vast amount of metal that is disposed between such surfaces and the bore 43, with this large volume of metal serving to resist deformation in surface 41, while maximum deformation of top surface 42 and intermediate deformation of end walls 45, 45 also occurs as shown in FIGURE 4.

Much the same type of operation is shown with respect to FIGURE 5 wherein the desired objective is to bring the surfaces 50, 51 and 52 of the lathe bed into co-planar alignment with each other.

To this end, a series of appropriately located apertures 53, 53, 53; 54, 54, 54, and 55, 55, 55 are respectively located with respect to the surfaces 50, 51 and 52 so as to cause the requisite deflection of the surface 50 by lowering the high edges 50a and 50b thereof to the lower end longitudinally extended position shown in dotted lines in FIGURE 5. Similarly, the apertures 54, 54 respectively deflect the surfaces 51 and 52 to the chain dotted line positions of FIGURE 5 with deflection occurring again because of the minimal metal resisting such deflection in the area affected.

It will be seen from the foregoing that there has been provided a new and improved type of apparatus for creating extreme degrees of levelness in a planar surface as used for precision measuring purposes. The foregoing specification shows that the concept of metal deformation can be employed provided that the deflecting mechanism in the form of plug and bore is located so that the deflecting force is resisted by minimum volumes of metal so that surface levelness can be achieved.

It will further be seen how the deflecting means of this invention can be repetitively used by virtue of the recovery properties of the metal and with minimal adjustment being required to achieve absolute accuracy.

While a full and complete description of the invention has been set forth in accordance with the dictates of the patent statutes, it is to be understood that the invention is not intended to be limited to the specific embodiment herein shown. Accordingly, modificatons of the invention may be resorted to without departing from the spirit hereof or the scope of the appended claims.

What is claimed is:

A measuring tool of the character described, comprising:
(A) an elongate substantially solid measuring element having
   (1) a longitudinal dimension that is relatively large with respect to its transverse dimension and
   (2) an uninterrupted substantially planar measuring surface along one longitudinal edge;
(B) angular indicating means secured to one end of said measuring element;
(C) a threaded tapered bore
   (1) opening inwardly from said planar measuring surface and
   (2) having an endless tapered wall surface
   (3) with the axis of said bore being substantially normal to said planar surface;
(D) a threaded tapered plug
   (1) adapted to be received within said bore and
   (2) exerting radially extending forces on said measuring element upon insertion of said plug into said bore
     (a) whereby said measuring element is distorted adjacent said bore and said planar surface is deflected out of its original plane; and (E) the angular relationship between said measuring element and said indicating means changing upon progressive insertion of the tapered plug into said bore.

References Cited by the Examiner

UNITED STATES PATENTS

| | | | |
|---|---|---|---|
| 1,163,921 | 12/1915 | Hess | 33—163 |
| 1,232,613 | 7/1917 | Scheeder | 33—112 |
| 1,634,019 | 6/1927 | Coullery | 33—163 |
| 2,126,896 | 8/1938 | Koller | 33—112 |
| 2,238,581 | 4/1941 | De Lisle | 33—99 |
| 3,075,596 | 1/1962 | Richardson | 177—172 |

FOREIGN PATENTS 11,843  1903  Great Britain.

LEONARD FORMAN, *Primary Examiner.*

H. N. HAROIAN, *Assistant Examiner.*